United States Patent [19]

Freund et al.

[11] Patent Number: 4,544,184
[45] Date of Patent: Oct. 1, 1985

[54] TAMPER-PROOF IDENTIFICATION CARD AND IDENTIFICATION SYSTEM

[75] Inventors: Robert F. Freund, Centerville; Daniel R. Valentine, Dayton, both of Ohio

[73] Assignee: Freund Precision, Inc., Dayton, Ohio

[21] Appl. No.: 511,465

[22] Filed: Jul. 7, 1983

[51] Int. Cl.⁴ .................. B42D 15/00; G09F 3/00; B41M 3/14
[52] U.S. Cl. .................... 283/94; 283/77; 283/82; 40/626; 427/7
[58] Field of Search ............. 40/2.2; 235/468, 493; 283/72, 77, 82, 94; 427/7

[56] References Cited

U.S. PATENT DOCUMENTS

| Re. 28,081 | 7/1974 | Travioli | 235/61.11 |
| 3,204,354 | 9/1963 | Berger | 283/77 |
| 3,245,697 | 4/1960 | Nugent | 283/82 |
| 3,468,046 | 9/1969 | Makishima | 40/2.2 |
| 3,564,215 | 2/1971 | Peeples, Jr. | 235/61.12 |
| 3,640,009 | 2/1972 | Komiyama | 40/2.2 |
| 3,802,101 | 2/1972 | Scantlin | 40/2.2 |
| 3,818,190 | 6/1974 | Silverman et al. | 235/61.7 B |
| 3,829,661 | 8/1974 | Silverman et al. | 235/61.7 B |
| 3,829,662 | 8/1974 | Furahashi | 235/61.12 |
| 3,949,501 | 4/1976 | Andrews et al. | 283/82 |
| 3,959,630 | 5/1976 | Hogberg | 235/61.12 N |
| 3,999,042 | 12/1976 | Silverman et al. | 235/61.7 R |
| 4,013,894 | 3/1977 | Foote et al. | 250/569 |
| 4,034,211 | 7/1977 | Horst et al. | 235/61.12 N |
| 4,064,389 | 12/1977 | Patterson | 235/431 |
| 4,066,873 | 1/1978 | Schatz | 40/2.2 |
| 4,092,526 | 5/1978 | Beck | 283/82 |
| 4,100,011 | 7/1978 | Foute | 283/82 |
| 4,119,361 | 10/1978 | Greenaway | 350/1.1 |
| 4,175,775 | 11/1979 | Kruegle | 283/7 |
| 4,180,207 | 12/1979 | Lee | 235/493 |
| 4,202,491 | 5/1980 | Suzuki | 235/491 |
| 4,213,038 | 7/1980 | Silverman et al. | 235/382 |
| 4,243,734 | 1/1981 | Dillon | 427/7 |
| 4,253,017 | 2/1981 | Whitehead | 283/82 |
| 4,359,633 | 11/1982 | Bianco | 235/468 |

Primary Examiner—Robert L. Spruill
Assistant Examiner—Paul M. Heyrana, Sr.
Attorney, Agent, or Firm—Biebel, French & Nauman

[57] ABSTRACT

A tamper-proof and wear resistant identification card having a support layer, a strip of magnetic tape for containing encoded information, transparent layers covering the front and rear surfaces of the support layer and a screen of optically-readable encoded information on a surface of one of the transparent layers.

6 Claims, 7 Drawing Figures

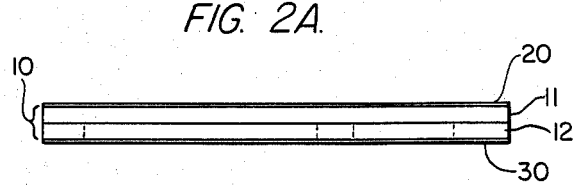
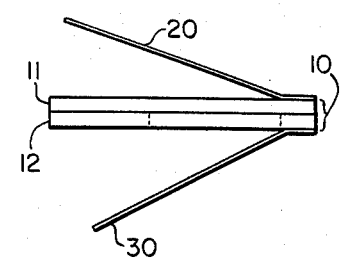
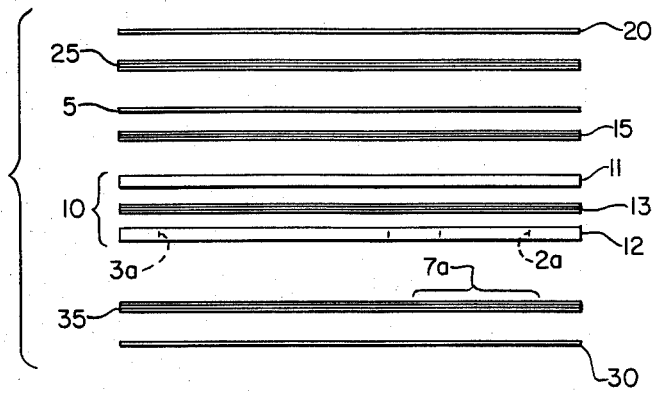
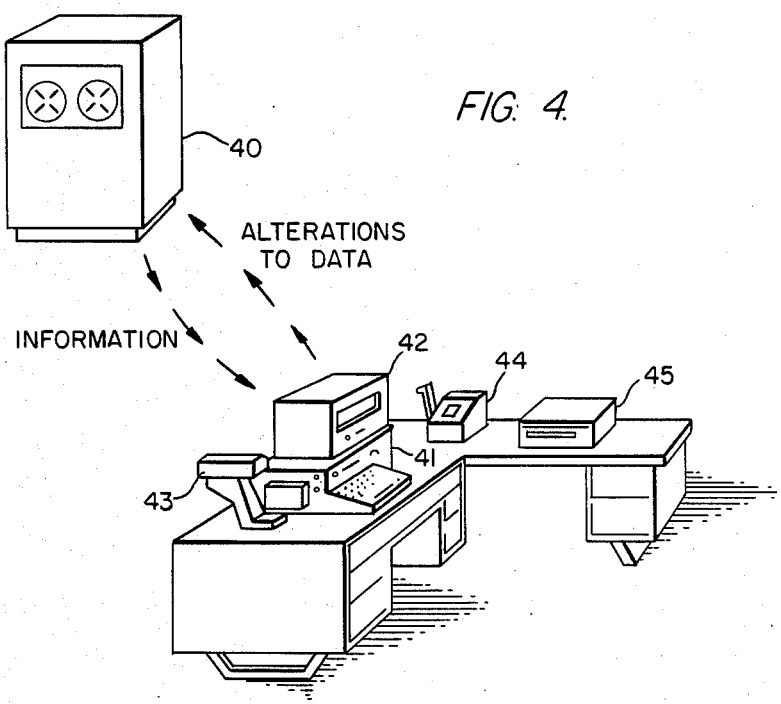

TAMPER-PROOF IDENTIFICATION CARD AND IDENTIFICATION SYSTEM

FIELD OF THE INVENTION

The present invention relates to the field of identification cards, and, more particularly, to identification cards containing encoded information.

BACKGROUND OF THE INVENTION

Almost no one in this country is without some sort of plastic card. We have credit cards, bank cards, and cards allowing us some privilege, for example, to drive a car or to have access to a restricted location. Although all of these cards provide different functions and they are often used in different ways, they may all be considered identification cards and it is important to ensure that the correct person possesses the correct identification card.

These cards provide some of the most basic conveniences that most people now take for granted. Credit cards eliminate the necessity of carrying checkbooks or large amounts of cash. Bank cards give us access to checking and savings accounts when it is convenient for us, rather than when it is convenient for the bank. Other cards are our passcard into government services (e.g., Social Security cards, welfare cards, driver's licenses) and into large organizations or facilities (e.g., factories, military bases). The plastic card has become an indispensible component of modern life.

The biggest drawback to the use of such cards is that, when they are stolen or counterfeited, the entire society feels the effect. Credit card fraud costs consumers by requiring merchants to charge higher prices. Consumers also directly and indirectly bear the load caused by unauthorized use of bank cards, social security cards, and checks which are cashed using false ID.

There are still other costs to society from fraudulent use of plastic cards. The use of counterfeited identification to gain unauthorized access to locations or accounts has far-reaching repercussions. To minimize the counterfeiting of security cards, increasingly elaborate security systems must be developed adding to the inconvenience of such systems and increasing these costs.

The basic plastic card is no longer adequate either for identification or for security. Cards must contain additional information or identification to ensure that the proper person is using the card.

Identification cards that need the most security have some personal identification on them so that a thief of a card cannot simply use the card. One example of this is bank cards which usually require a unique user identification number. Although this system has proven effective, it does not stop theft by persons who know the personal number of the owner of the card. Also, it is unsuitable for widespread use because everyone cannot be expected to learn different personal identification numbers for each credit card, bank card, and security card.

Another solution is to include a photograph of the user on the card as is done on many driver's licenses and security cards. This too has been effective, but counterfeit cards can be made by replacing the pictures in stolen cards with other pictures.

A third solution to the counterfeiting problem is the inclusion on the plastic cards of a magnetic strip containing particular information unique to each user. If only a few of all the possible codes on the magnetic strip are valid, then it is difficult to know which code to put on the strip, and thus, it is difficult to counterfeit such cards. This system, however, does not stop a thief from using the card nor does it prevent counterfeiters from manufacturing fake cards because valid codes can be read from a valid card and used on counterfeit cards.

Another problem with the current plastic identification cards is that with their increased use, they are more susceptible to wearing out and are more likely to be exposed to a harmful environment. In certain work places identification cards come in contact with solvents which destroy the card. Cards can also be destroyed by exposure to extremes of temperature, a common condition at many military facilities. Even without the solvents and the temperature extremes, the practice of carrying cards in wallets, or their use in credit card machines causes the cards to wear out quickly.

Accordingly, one object of this invention is a durable tamper-proof proof identification card which cannot easily be counterfeited.

Another object of this invention is an identification card with multiple information fields which can be compared with one another to ensure positive identification of the bearer of the card.

Yet, another object of this invention is to provide an identification card that can be used to access additional information in a computer system.

SUMMARY

To achieve the objects and in accordance with the purpose of the invention, as embodied and broadly described herein, the tamper-proof and wear resistant identification card comprises a support member having front and rear surfaces, recording means such as high coercivity magnetic tape on one surface for storing magnetically encoded data, transparent layers overlying the front and rear surfaces of the support member, each transparent layer being bonded to the support layer and a screen imprinted with encoded data, such as a dot matrix or bar code on a first surface of one transparent layer where the first surface is adjacent the surface of the support member. The identity card is part of an identification system which comprises, in addition to the identity card, means for magnetic recording of data onto the magnetic tape of the identity card, means for reading the optically readable characters imprinted on the screen of the identity card, means for reading the magnetically encoded data and means for correlating the optically readable data and the magnetically encoded data on the card.

BRIEF DESCRIPTION OF THE DRAWINGS

FIG. 2A is a side view of the identification card of FIG. 1 with the layers laminated together.

FIG. 2B is an end view of the identification card of FIG. 1 with the base sections bonded together and the front and rear covers open.

FIG. 3 is an exploded side view of an identification card of the invention showing each of the layers of the card.

FIG. 4 is a schematic diagram of the equipment used to make an identification card of the invention and use it for identification.

DESCRIPTION OF THE PREFERRED EMBODIMENT

Reference will now be made in detail to a presently preferred embodiment of the invention, an example of which is illustrated in the accompanying drawings.

The identification card of this invention contains encoded information which is bonded to the card so that any attempt to tamper with the card destroys the information. In one preferred embodiment, the encoded information is in the form of a matrix of ink dots which cannot be perceived by the human eye but which can be detected when exposed to ultraviolet radiation. The ink used has an affinity for the materials used to make up the multiple layers of the card and when delamination of the card is attempted, the ink dot code is either destroyed so that it can no longer be detected or altered so that it does not correspond with other information contained on the card.

An added feature of the card of this invention is an additional recording means, which also contains an identification code. In a preferred embodiment, a magnetic strip containing a layer of high coercivity magnetic material is used as the recording means. Before the information from this magnetic strip is read, a magnetic reader applies a magnetic field to the strip strong enough to erase all the information from most magnetic strips, but not from the high coercivity material in the magnetic strip used in the card of this invention. A counterfeit card which does not use high magnetic field recording methods in conjunction with magnetic materials having a high enough coercivity for the magnetic strip will be detected by the card verification system of this invention.

CONSTRUCTION OF THE CARD

Figure 1A:
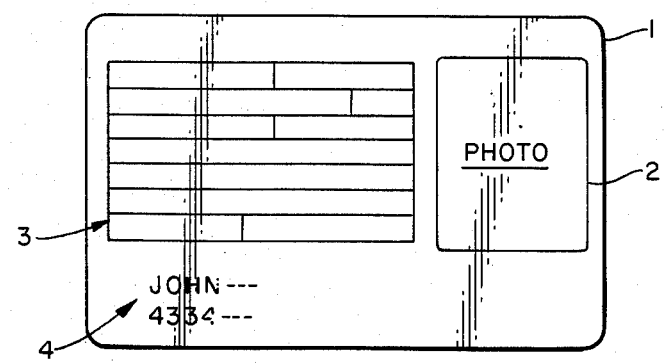
FIG. 1A is a front view of an identification card of the invention showing an area for a photograph and an area for information identifying the card owner.
Figure 1B:
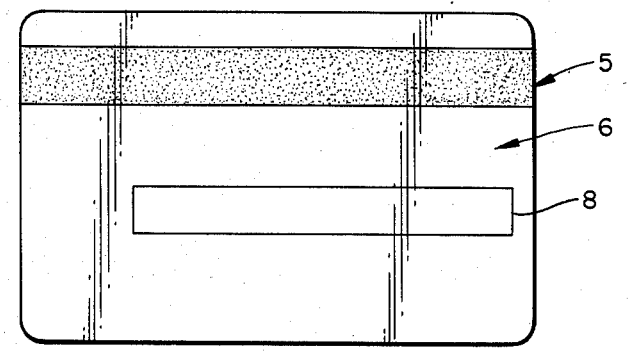
FIG. 1B is a rear view of the identification card of FIG. 1A showing a space for a signature and a strip of magnetic tape.

The front face of identification card 1 of this invention can be seen in FIG. 1A FIG. 1B shows a rear view of the card. In the preferred embodiment shown in FIG. 1A and 1B, card 1 contains a photograph 2 approximately $1'' \times 1\frac{3}{4}''$. Photograph 2 can be any standard photograph used in identification cards. The photograph need not be rectangular as shown. For example, the photograph can be oval or square and of a size consistent to fit within the boundaries of the particular card.

Figure 1C:
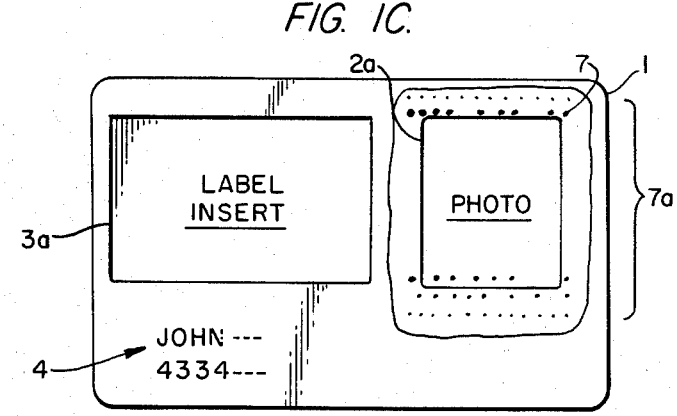
FIG. 1C is a front view of an identification card of the invention with the base sections bonded together and the front and rear covers open.

As shown in FIG. 1C, card 1 also contains an optically readable code, such as a dot matrix code 7 in one area referred to as a screen 7a. In the embodiment shown in the Figures, dot matrix 7 is written on a bond layer 35 between a front cover 30 and a front base 12. The dot matrix may be applied in an ink which is detectable only under a certain type of light, e.g. ultraviolet. It may be applied at a location on the bond layer 35 in a position to cover a portion of the photograph 2, but such placement is not critical. The one restriction on the placement of the dot matrix is that it must be placed at least 3/32" from the perimeter of the card to allow for proper lamination of the card and sealing of its edges. The screen 7a should also be slightly spaced from any areas of the card which may be embossed.

The matrix of dots in the screen can comprise any desired code. Preferably, the code consists of a pattern of dots placed horizontally and vertically on the face of the card. These dots can represent a sequence of characters in a unique identification code e.g., one chosen by a machine which controls the manufacture of the card. The choice of the code is not critical to the invention and can be a standard numeric or alphanumeric code which is generated by a computer according to some pseudo-random coded-generating procedure, many of which are well known in the art.

In the preferred embodiment, the card also contains a label 3 which can hold any information relevant to the use of the card. In the example of the card shown in FIG. 1A, the label 3 on military ID card 1 includes personal information, such as date of birth, height and color of eyes, and service information, such as rank and branch of service. Preferably, the label is on the same surface of the card as the photograph 2 and is made of a plastic onto which information can be typed or printed. Label 3 in the preferred embodiment also has the expiration date of the card printed on the background so security guards checking this ID can tell more easily whether the card has expired. In the finished card, the label 3 is located in a recess 3a in the base section 12 and is covered by bond 35 and front cover 30.

The preferred embodiment of card 1 can also contain an embossed area 4 which may be used to encode information such as the name of the card owner or some identifying code like an account number. This is especially useful for transferring information from the card to receipts.

The back of card 1 is shown in FIG. 1B. It contains a magnetic strip 5 preferably containing recorded information which corresponds to the identification information stored in the dot matrix on the face of the card. In the preferred embodiment this magnetic strip is on the opposite surface of the card from the photograph. The magnetic strip in the preferred embodiment consists of a bottom layer of very high coercive force magnetic oxide, e.g., 4000 oersteds, and a top layer of standard coercive force magnetic oxide, e.g., 300 oersteds. A single layer of high coercivity tape can also be used instead of the double layer strip. A thin layer of protective laminate covers the tape.

The high coercive force magnetic strip requires a special encoding head to record data. This encoding head provides "deep" encoding of data, ensuring the permanence of that data. Data recorded in this manner cannot be altered or erased by ordinary magnetic fields like permanent magnets, bulk tape erasers, etc., or by any field less than about 2500 oersteds.

This "deep" encoding of data provides another hinderance to counterfeiters. The verification station which reads this card can have a "selective erasure" field of approximately 500–1500 oersteds magnetic force. A counterfeit card not having the high coersivity tape would be partially erased by such a field and exposed as counterfeit.

Preferably, the back of the card would also contain an area 6 for instructions and rules for use of the card and a panel containing the signature of the card owner. The signature would be entered before the back cover is bonded to the card so that the signature could not be erased or altered without removing the card's cover.

FIGS. 2A and 2B show views of the card, from the side and end edges respectively. The card is comprised of support member 10, including a rear base 11 and a front base 12. The support member 10 is covered by a front cover 30 and a back cover 20 each made of transparent polyester.

Each of these layers, as well as the other elements of the card, are shown in more detail in the exploded view in FIG. 3. In the preferred embodiment of the card shown in FIG. 3, support member 10 includes rear base 11 and front base 12 each base being an opaque tensilized polyester. The front base 12 and rear base 11 are bonded together by bond 13 which is a thin layer of polyurethane with polyethylene on each side. The exposed surface of front base 12 is the front surface of support member 10 and the exposed surface of rear base 11 is the rear surface of support 10. The front base 12 contains, in the preferred embodiment, two shallow cutouts or recesses. Recess 2a which can be seen in FIG. 1C holds photograph 2. Recess 3a, also seen in FIG. 1C, holds label 3 and is approximately the same size as label 3. These recesses allow the photo and label to be inserted 15 into the bases and have their top surface flush with the surface of the base.

Layers of the card such as bases 11 and 12 may be made separately by well known techniques to the desired dimensions. In order to receive a photo or label, the bases may be punched to create a recessed area of the same depth as the thickness of the photo or label.

Magnetic strip 5 is attached to the rear surface of support member 10 via bond 15. Bond 15, like all the bonds used in the manufacture of the preferred embodiment of the card, consists of a polyurethane layer coated on each side with polyethylene. Although this type of bond is preferred for use with the polyester support, other types of adhesives are well known for use in bonding layers of identification cards together.

A similar bond 25 bonds back cover 20 to magnetic strip 5 and the rear surface of support member 10. Back cover 20 is clear polyester.

Photo 2 and label 3 are inserted into recesses 2a and 3a, respectively. Screen 7a in the preferred embodiment overlies photograph 2. Dot matrix 7 containing an identification code is printed so that it covers at least a portion of the photograph 2 and a portion of support member 10. The dot matrix preferably is printed using microencapsulated ink supplied by a nylon ribbon carrier. As mentioned above, the ink chosen for the preferred embodiment is not visible to the unaided human eye, but when the card is illuminated with long wave ultraviolet light (approximately 335 nm) the ink fluoresces and appears as yellow-green dots. These dots can then be sensed by a suitable optical reader. Alternatively, a bar code may be printed across a portion of or along an edge of the photograph in a machine readable medium which may be detected in the presence of ultraviolet or infra red light. Perferably, the bar code is printed over a band of like-colored ink, which is not responsive to the radiating light, thereby eliminating the visual presence of the bar code.

The ink chosen to print the dot matrix has an affinity for polymers and organic-based materials. When front cover 30, which is clear transparent polyester, is bonded to support member 10 via bond 35, the ink printed on bond layer 35 becomes permanently embedded in the support member 10, FIG. 2A and the front cover 30. Bond 35 is, e.g., a thin layer of polyurethane coated on both sides with polyethylene. Any attempt to delaminate the card to change the photograph destroys or alters the code in the dot matrix so that the code can no longer be correctly read by the machines designed to examine these cards.

The identification card of the invention withstands temperatures from $-50$ F. to $+250$ F., and retaining its flexibility over that range. This card also resists penetration by chemicals, greases, oils, or solvents such as acetone, methylethylketone or ethylacetate. Tests on the card have shown it capable of withstanding 2,000 cycles of 90° flexures without showing a weakness and 200,000 cycles of 45° flexures without damage to the card. In addition, this card retains its flexibility and transparency with age.

The identification card of this invention is tamper-proof because any attempt to remove the front cover 30 of the card destroys the code in the dot matrix. Furthermore, the high coercivity magnetic tape 5 on the rear of the card allows machine readers of these cards to employ a selective erasure field which will destroy any magnetic card code not recorded on high coercivity tape. Finally, the card is very resistant to wear, heat and exposure to chemicals.

FIG. 4 depicts schematically equipment used in making the identification card of the present invention. Data from a central processing unit 40 can be called up on a terminal 41 to obtain information on an individual whose identity card is being prepared. Information from the central processing center is verified with the individual and the data may be changed if needed on the terminal 41. Any incorrect data or new data is entered in the central data processing center. A kit containing the materials necessary to prepare the identification card is placed in a processing machine 42 which machine contains a key board for control and input of information, a printer, a photo-optic reader, an encoder-reader for magnetic tape and an embosser. Data from the central processing center or from the individual is printed on the label 3 of the ID card. Data is encoded on the bond layer 35 and read into the photo-optic dot matrix reader. Additional verification data is encoded on the magnetic tape, the signature of the individual is placed on the rear base 11 and a photograph taken of the individual with camera 43. The support is inserted in the photo die cutter 44 to trim the photo and information label. The layers of the card are then assembled and laminated in laminator 45. Additional data may also be entered on the identification card by embossing after the card has been assembled and laminated together.

Verfication of the data encoded on the identification card when presented by a person is accomplished by inserting the card in a terminal capable of detecting and interpreting the type of optically and magnetically encoded information present on the card. If the data from both the optical and magnetic sources is consistent, the terminal would be programmed to verify the authenticity of the card. As a higher level of security, the terminal could be used to further verify the data with a central computer.

What is claimed is:

1. A tamper-proof and wear-resistant identification card comprising:
    a support member having a front surface and a rear surface;
    a recording means on one of said surfaces for storing encoded data;
    a first transparent layer overlying said front surface of said support member and having a first surface;
    a transparent bond layer attaching said first surface to said front surface of said support member;

a second transparent layer overlying said rear surface of said support member and said recording means;

a second transparent bond layer bonding said second transparent layer to said rear surface of said support member; and an invisible optically-readable code imprinted at the bond layer between one of said transparent layers and said support member.

2. The identification card of claim 1 wherein said optically-readable code includes coded alphanumeric characters corresponding to data encoded on said recording means.

3. The identification card of claims 1 or 2 further comprising said code being imprinted in ink dispersed in one of said bond layers upon bonding of said one transparent layer to said support member.

4. In an identification card having a thin flexible self-sustaining support member having front and back surfaces, a magnetic recording stripe fixed to said back surface a code area on said support member bearing embossed indicia, a recessed area receiving a visually inspectable identification such as a photograph, a transparent cover and a transparent bond layer attaching said cover to one of said surfaces;

the improvement comprising an invisible verification code located at said bond layer between said cover and said one surface, said verification code being detectable upon exposure to radiant energy of a predetermined wavelength and being destructable if the bond is disturbed.

5. An identification card as defined in claim 2 or 4, wherein said code is imprinted by a material detectable only under light conditions outside the visible spectrum.

6. An identification card as defined in claims 1 or 2 wherein said recording means includes a layer of high coercivity magnetic tape.

* * * * *